United States Patent [19]
Santos et al.

[11] Patent Number: 5,546,265
[45] Date of Patent: Aug. 13, 1996

[54] DIGITAL CIRCUIT INTERRUPTER SHUNT TRIP CONTROL CIRCUIT

[75] Inventors: Esteban Santos; George R. Ribar, Jr., both of Windsor, Conn.

[73] Assignee: General Electric Company, New York, N.Y.

[21] Appl. No.: 247,159

[22] Filed: May 20, 1994

[51] Int. Cl.$^6$ .................................................. H02H 3/00
[52] U.S. Cl. .................................................. 361/93; 361/95
[58] Field of Search ........................................... 361/93–97

[56] References Cited

U.S. PATENT DOCUMENTS

| | | | |
|---|---|---|---|
| 4,672,501 | 6/1987 | Bilac et al. | 361/96 |
| 4,794,356 | 12/1988 | Yu et al. | 335/13 |
| 4,833,563 | 5/1989 | Russell | 361/92 |
| 4,870,531 | 9/1989 | Danek | 361/93 |

OTHER PUBLICATIONS

Santos et al "Digital Circuit Interrupter with Multiple Accessory Function". U.S. Patent Appln. SN: 08/239,822, Filed: May 9, 1994 (Docket:41PR–7170).

Pollman et al "Digital Circuit Interrupter Shunt Trip Accessory Module". U.S. Patent Appln. No: 08/247,198; Filed: May, 20, 1994 (Docket: 41PR–7174).

Primary Examiner—Jeffrey A. Gaffin
Assistant Examiner—Sally C. Medley
Attorney, Agent, or Firm—Carl B. Horton; Richard A. Menelly

[57] ABSTRACT

An integrated circuit breaker is described having shunt trip capability along with automatic overcurrent protection. The shunt trip unit provides auxiliary power to the trip unit and allows the trip unit to report and record the shunt trip operation. A control circuit determines whether there is sufficient operating power available as well as the condition of the circuit breaker contacts prior to executing the shunt trip operation.

6 Claims, 2 Drawing Sheets

DIGITAL CIRCUIT INTERRUPTER SHUNT TRIP CONTROL CIRCUIT

BACKGROUND OF THE INVENTION

U.S. Pat. No. 4,672,501 entitled "Circuit Breaker and Protective Relay Unit" describes the use of a digital circuit interrupter employing a microprocessor in combination with ROM and RAM memory elements to provide both relaying as well as protection function to an electrical distribution system.

U.S. Pat. No. 4,833,563 entitled "Molded Case Circuit Breaker Actuator-Accessory Module" describes an integrated protection unit that includes basic overcurrent protection facility along with selective electrical accessories. A specific actuator-accessory module is selected to give the required accessory function along with basic overcurrent protection. This patent supplies a separate shunt trip signal directly to the actuator-accessory module without connection to the circuit breaker trip unit circuit.

U.S. patent application Ser. No. 08/247,198 filed May 20, 1994 entitled "Digital Circuit Interrupter Shunt Trip Module" describes an integrated circuit breaker having shunt trip capability along with automatic overcurrent protection. The shunt trip unit provides auxiliary power to the trip unit and allows the trip unit to report and record the shunt trip operation.

When a shunt trip signal is generated, it is important to determine whether there is sufficient operating power to operate the circuit breaker actuator to initiate the circuit breaker contact separation as well as determining whether the circuit breaker contacts are already separated.

The subject invention proposes a shunt trip control circuit that interacts with the circuit breaker trip unit to provide shunt trip circuit interruption whether the signal processor within the trip unit is operational or not.

SUMMARY OF THE INVENTION

An integrated circuit breaker is described having shunt trip capability along with automatic overcurrent protection. An independent shunt trip module provides auxiliary power to the trip unit to allow the trip unit microprocessor to report and record the shunt trip operation. A shunt trip control circuit determines whether the trip unit is operational and whether the circuit breaker contacts are closed before initiating the shunt trip operation.

DESCRIPTION OF THE PREFERRED EMBODIMENT

Figure 1:
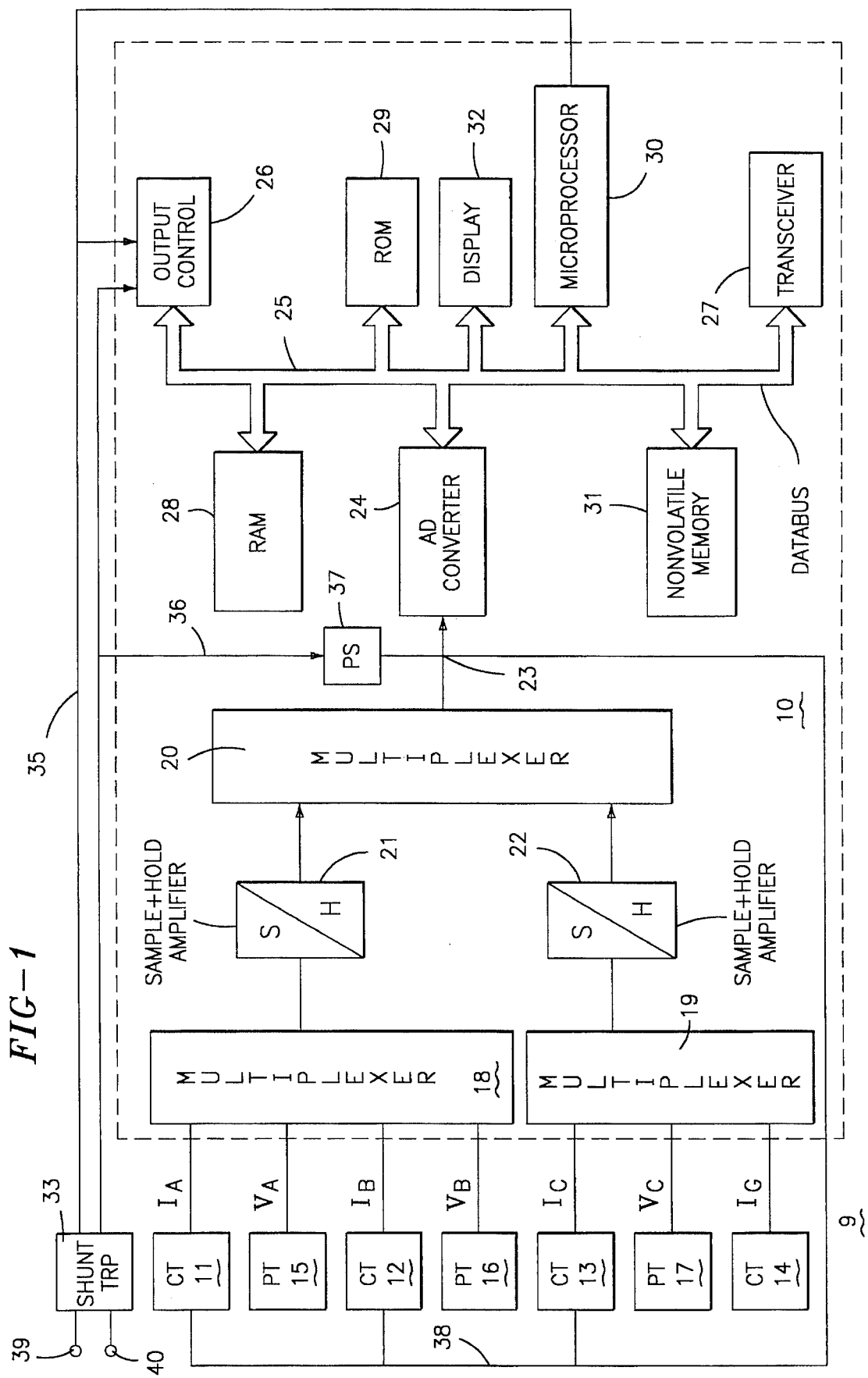
FIG. 1 is a schematic representation of a digital circuit interrupter that includes the shunt trip control circuit according to the invention.

As described within the aforementioned U.S. Pat. No. 4,672,501 a circuit breaker controller 9 such as depicted in FIG. 1 is contained on a printed circuit card 10 to which external connection is made with current transformers 11–14 and potential transformers 15–17. The electrical input is transmitted through multiplexers 18–20 and sample and hold amplifiers 21,22 to an A/D converter 24 by conductor 23 and control is achieved by utilization of a data bus 25 which is interconnected with an output control 26, transceiver 27, and RAM 28. The ROM 29, microprocessor 30 and nonvolatile memory 31 operate in the manner described therein to insure complete overall circuit protection. The information as to the status of the circuit breaker contacts (not shown) that are controlled by the output control 26 is displayed on the display 32 that is similar to that described in U.S. Pat. No. 4,870,531 entitled "Circuit Breaker removable Display and Keyboard". Operating power to the printed circuit card 10 is supplied by the current transformers 11–14 from the associated electrical distribution system. In accordance with the invention, shunt trip facility is provided by connection of a shunt trip module 33 with the microprocessor 30, output control 26 and the trip unit power supply 37 by means of conductors 35 and 36. Operating power to the trip unit power supply is provided by the current transformers 11–13 over conductor 38 when the associated electrical distribution system is operational. Supplemental operating power is supplied by the shunt trip module by application of a voltage signal by the user over input terminals 39, 40. The electrical signal supplied to the output control circuit 26 interrupts the associated electrical distribution circuit. The occurrence of the shunt trip interruption is transmitted to the microprocessor for storage and display.

Figure 2:
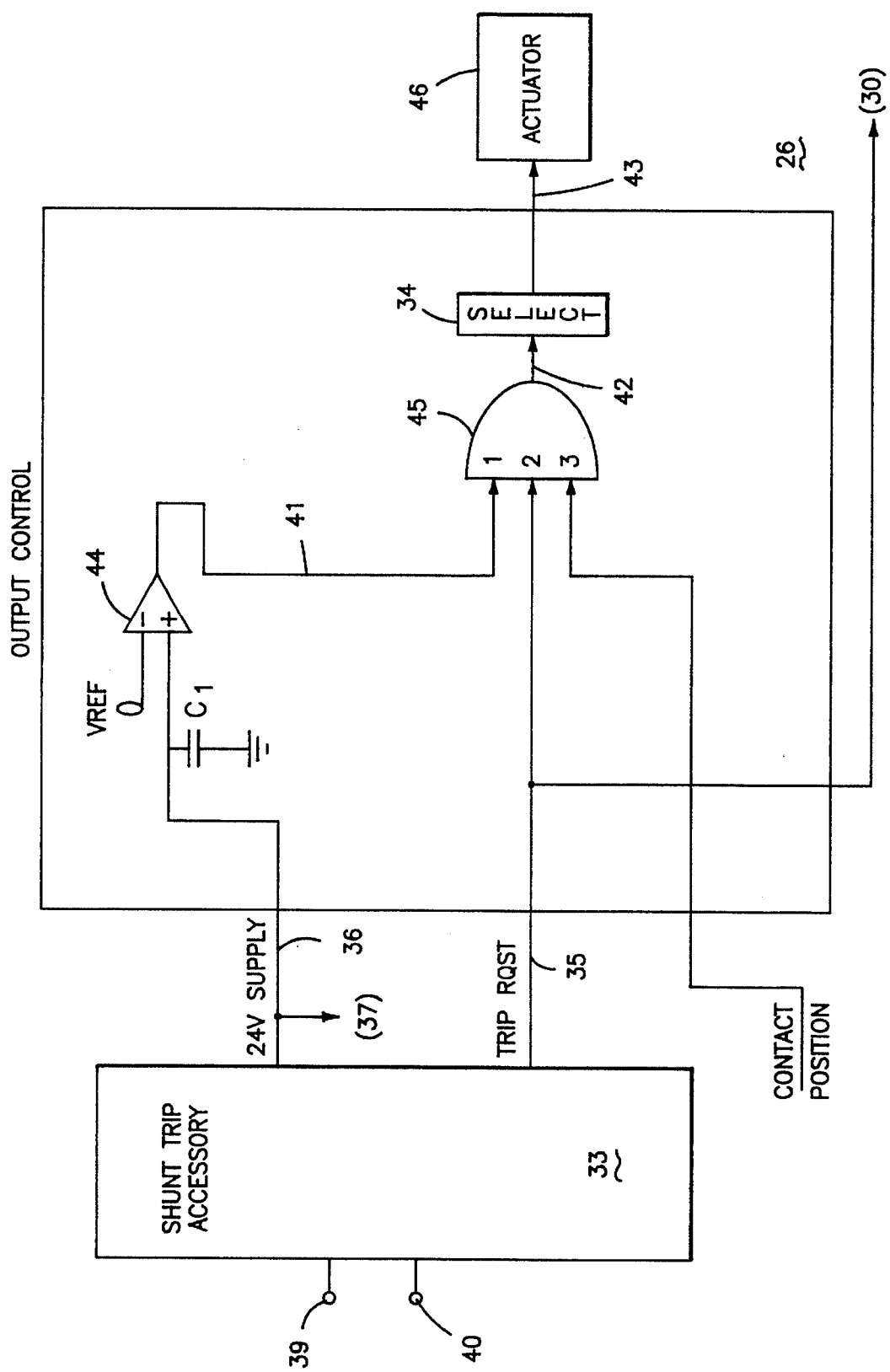
FIG. 2 is an enlarged diagrammatic representation of the components within the control circuit of FIG. 1.

The functional components of the output control circuit 26 are depicted in FIG. 2. The voltage signal supplied to inputs 39, 40 is conditioned within the shunt trip module 33 in the manner described within the aforementioned U.S. patent application (41PR7174) and is outputted over conductor 35 to the output control circuit 26 for evaluation in the manner to be described below as well as to the microprocessor 30 of FIG. 1 for storage and display purposes. A power supply voltage is inputted to the trip unit power supply circuit 37 of FIG. 1 over conductor 36 and to one input of the comparator 44 within the output control circuit 26 of FIG. 2 for comparison to a reference voltage applied to the other input. The storage capacitor C1 insures that the applied voltage remains constant during the comparison. If the applied voltage exceeds the reference voltage, the comparator outputs a signal to the first input terminal to a multiple AND gate 45 over conductor 41. This assures that the applied voltage signal is sufficient to operate the actuator 46 to separate the circuit breaker contacts. The shunt trip voltage signal is transmitted to the second input terminal of the multiple AND gate and to the microprocessor 30. The third input terminal of the multiple AND gate is connected back to the auxiliary switch unit within the circuit breaker to determine the ON or OFF condition of the circuit breaker contacts at the time the shunt trip signal is applied. One such auxiliary switch is described within U.S. Pat. No. 4,794,356 entitled "Molded Case Circuit Breaker Auxiliary Switch Unit". It is important to determine whether the circuit breaker contacts are already open when the shunt trip voltage signal is applied in order to insure that the contacts are opened at the instant that the signal is applied rather than at a later time when the circuit breaker contacts become closed and the shunt trip signal is not intended. Accordingly, the multiple AND gate will only output a shunt trip initiating signal to the actuator 46 when there is adequate power to operate the actuator and when the circuit breaker contacts are actually closed. When a trip signal is outputted from the multiple AND gate 45 to the select circuit 34 by conductor 42, the signal is acted upon in the manner described within U.S. patent application Ser. No. 08/239,822 filed May 9, 1994 entitled "Digital Circuit Interrupter with Multiple Accessory Function". The output from the select circuit 34 is then passed by conductor 43 to the actuator unit 46 for interrupting the circuit breaker contacts to complete the shunt trip operation. One example of an actuator unit responsive to a shunt trip signal is found within U.S. Pat. No. 4,833,563 entitled "Molded Case Circuit Breaker Actuator Accessory-Module."

An output control circuit has been herein described for use within a circuit breaker electronic trip unit having shunt trip facility. The output control circuit insures rapid and efficient operation of the shunt trip module by determining that there is sufficient operating power to activate the interruption and that the circuit breaker contacts are closed at the time that the shunt trip signal is applied.

We claim:

1. An electronic trip unit within a circuit breaker having overcurrent and shunt trip unit circuit interruption comprising:

transformer means arranged for connection with an electrical distribution system;

a processor circuit connecting with said transformer means receiving sample current signals from said distribution system to determine the occurrence of an overcurrent condition;

trip initiating means connecting with said processor circuit connecting with said transformer means and providing operational power to said processor circuit;

power supply means within said processor circuit connecting with said transformer means and providing operational power to said processor circuit;

a shunt trip signal source connecting with said processor circuit for providing auxiliary power to said processor circuit and to input a shunt trip signal to said processor circuit upon command; and an output control circuit connecting with said processor circuit and said trip initiating means and arranged for determining the presence of operating power to said processor circuit and providing a control signal to said trip initiating means to separate contacts contained within an associated breaker;

said output control circuit includes a comparator having a first input connecting with said shunt trip signal source and a second input connecting with a reference voltage to determine whether power voltage supplied by said shunt trip signal source exceeds said reference voltage and providing an output signal on an output thereof when said power voltage signal exceeds said reference voltage.

2. The electronic trip unit of claim 1 further including an AND gate having one input connecting with said shunt trip signal source and another input connecting with said comparator output.

3. The electronic trip unit of claim 2 wherein said AND gate includes a third input connected with means associated with said circuit breaker contacts for providing indication when said circuit breaker contacts are in a closed condition.

4. The electronic trip unit of claim 3 wherein said AND gate provides said control signal to said trip initiating means when a signal voltage occurs on said first, second and third inputs.

5. The electronic trip unit of claim 3 wherein said means associated with said circuit breaker contacts comprises an auxiliary switch.

6. The electronic trip unit of claim 2 further including a storage capacitor supplying operating voltage to said comparator and said inverter.

* * * * *